(12) United States Patent
Winter et al.

(10) Patent No.: US 11,350,788 B2
(45) Date of Patent: Jun. 7, 2022

(54) COOKING GRILL ASSEMBLY

(71) Applicant: FISHER & PAYKEL APPLIANCES LIMITED, Auckland (NZ)

(72) Inventors: Ritchie David Winter, Dunedin (NZ); Fleurine Marie Barré-Debilly, Dunedin (NZ); Adam Charles Moody, Dunedin (NZ); Jeremy Brandon Lynn, Dunedin (NZ)

(73) Assignee: Fisher & Paykel Appliances Limited

( * ) Notice: Subject to any disclaimer, the term of this patent is extended or adjusted under 35 U.S.C. 154(b) by 150 days.

(21) Appl. No.: 16/695,617

(22) Filed: Nov. 26, 2019

(65) Prior Publication Data
US 2020/0163490 A1 May 28, 2020

(30) Foreign Application Priority Data

Nov. 26, 2018 (NZ) ........................ 748389

(51) Int. Cl.
*A47J 37/07* (2006.01)
(52) U.S. Cl.
CPC ........ *A47J 37/0731* (2013.01); *A47J 37/0704* (2013.01); *A47J 2037/0795* (2013.01)
(58) Field of Classification Search
CPC ................ A47J 37/0731; A47J 37/0704; A47J 2037/0795
USPC ............................................ 126/25 R, 41 R
See application file for complete search history.

(56) References Cited

U.S. PATENT DOCUMENTS

| | | | | |
|---|---|---|---|---|
| 2,893,373 | A * | 7/1959 | Rundle | A47J 37/0763 126/9 R |
| 3,484,069 | A * | 12/1969 | Larson | A47F 5/0823 248/220.42 |
| 5,483,947 | A | 1/1996 | Giebel et al. | |
| 5,694,917 | A | 12/1997 | Davidson et al. | |
| 2009/0283091 | A1 * | 11/2009 | Deng | F24C 15/107 126/41 R |

FOREIGN PATENT DOCUMENTS

CN 202739762 2/2013

OTHER PUBLICATIONS

DCS "'DS' Series Grills' features guide dated 2001.
(Continued)

*Primary Examiner* — Avinash A Savani
(74) *Attorney, Agent, or Firm* — Clark Hill PLC; James R. Foley

(57) ABSTRACT

A cooking grill having a fire box with a cooking region and a panel at the rear or side of the cooking region of the firebox. The panel is adapted to support a shelf above the cooking region, the shelf having at least one prong extending therefrom. The panel has at least one aperture for receiving a respective prong of the shelf, and an abutment, for each aperture, positioned on the side of the panel remote from the cooking region and positioned with respect to its aperture to bear a respective prong of a shelf inserted through its aperture. Each prong of a shelf is inserted through an aperture such that a bottom part of the prong is supported by the periphery of the aperture and a top part of the prong bears upwardly against the abutment to support the shelf in a cantilevered fashion above the cooking region.

15 Claims, 11 Drawing Sheets

(56) References Cited

OTHER PUBLICATIONS

DCS Use and care guide for 'The Professional DS, FS Series Grill' dated Dec. 2004.
DCS Use and care guide for 'The Professional 36"/48" BGB Grill' dated Dec. 2004.

* cited by examiner

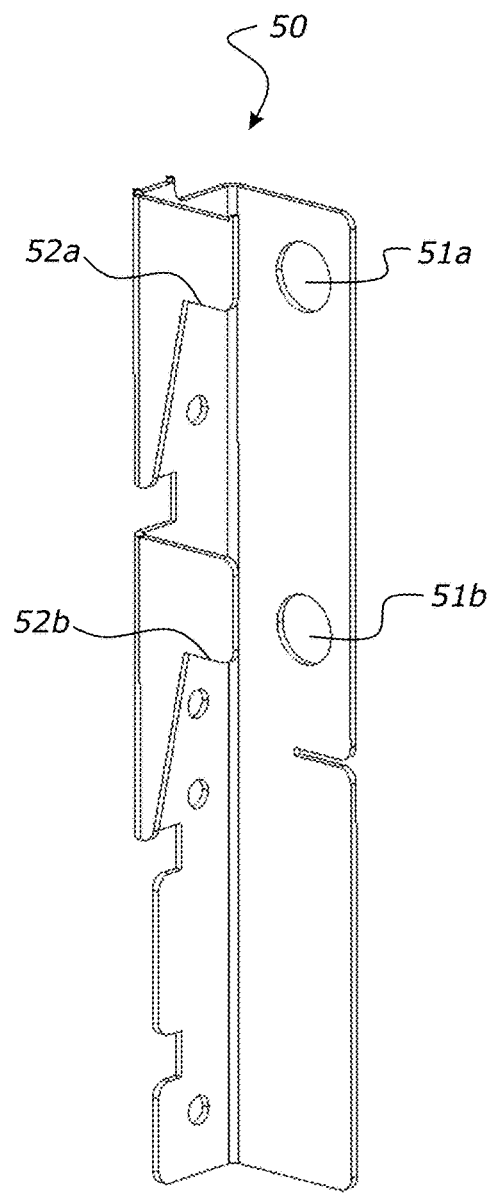
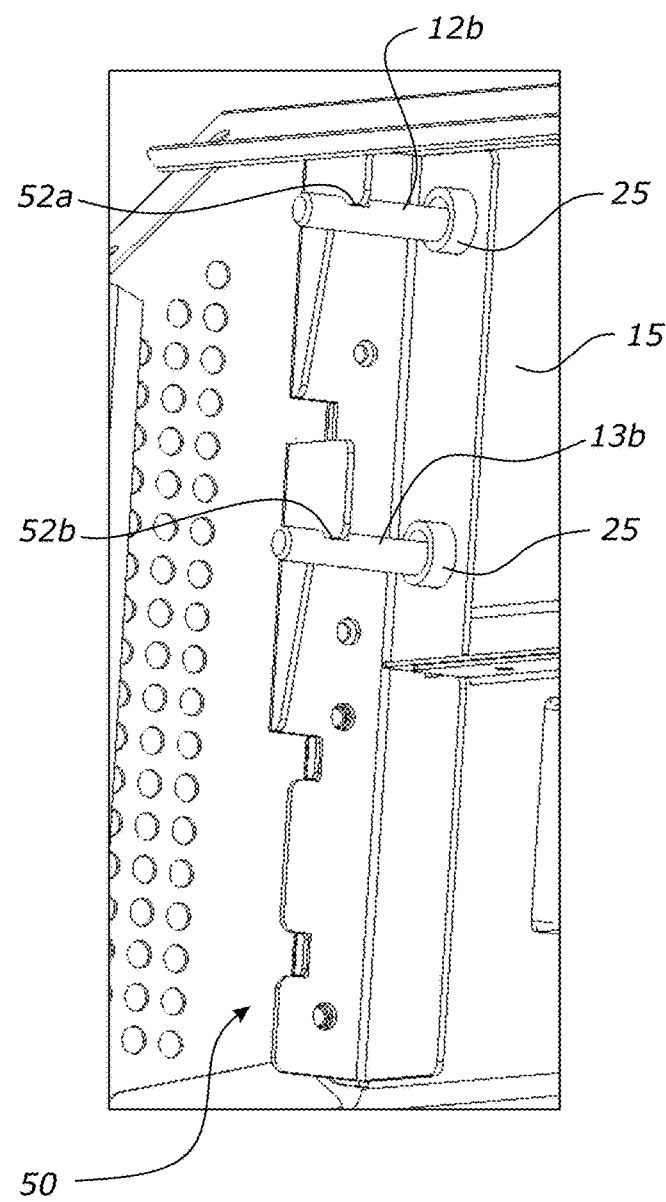
*FIG. 9A*  *FIG. 9B*

COOKING GRILL ASSEMBLY

CROSS-REFERENCE TO RELATED APPLICATIONS

This application claims priority to New Zealand Patent Application No. 748389, filed on Nov. 26, 2018, the disclosure of which is hereby incorporated by reference.

FIELD OF THE INVENTION

The present disclosure relates to outdoor cooking grills or and more particularly though not solely, to cooking grills adapted to incorporate a supported shelf.

BACKGROUND OF THE INVENTION

Cooking grills provide multiple methods of cooking food including applying heat from beneath a grilling surface supporting the food. Cooking grills can be used for cooking large volumes of food served during parties, gatherings or for other celebratory occasions. Cooking grills often incorporate shelves for storing food near/above the grilling surface. This can be useful for storing and/or keeping the food warm after cooking.

Typically the cooking region, including the grilling surface, of a cooking grill is at least partially enclosed by a surround structure at its rear and sides to contain heat and to shelter the cooking region from wind. A problem with shelves in existing cooking grills is that they require support from at least two walls of the partial surround structure of the cooking region (see FIGS. 1A and 1B, for example). FIG. 1A (from U.S. Pat. No. 5,483,947A) discloses a cooking grill with shelves supported above the grilling surface by ledges on the two side walls of a partial surround of the cooking region. FIG. 1B (from CN202739762U) discloses a barbecue grill with a grilling rack supported by the rear wall and the two side walls of the partial surround of the cooking region. A problem with having the shelves/rack supported in the manner disclosed in FIGS. 1A and 1B is that the supporting structural features add clutter to the overall cooking grill set up, reducing its aesthetic appeal. Shelf/rack supports within the cooking region also provide surfaces for the accumulation of grease and other potentially flammable food residue, and must be regularly cleaned. Still further, the greater the number of connections/contacts between a shelf and the surrounding structure, the more complicated/difficult it is to attach/detach.

SUMMARY OF THE INVENTION

It is an object of the present invention to provide cooking grill with a shelf or to at least partially ameliorate some of the shortcomings mentioned above and/or provide the public with a useful choice.

In a first aspect, the present invention consists in a cooking grill, comprising:
a fire box with a cooking region; and
a panel at the rear or side of the cooking region of the firebox, the panel adapted to support a shelf above the cooking region, the shelf having at least one prong extending therefrom, the panel comprising:
  at least one aperture, each aperture for receiving a respective prong of a shelf, and
  an abutment, for each aperture, positioned on the side of the panel remote from the cooking region and positioned with respect to its aperture to bear a respective prong of a shelf inserted through its aperture;
wherein in use, each prong of a shelf is inserted through an aperture such that a bottom part of each prong is supported by the periphery of an aperture and a top part of each prong bears upwardly against an abutment to support the shelf in a cantilevered fashion above the cooking region.

Optionally, the cooking grill further comprises at least one shelf above the cooking region, the at least one shelf having a plurality of prongs and the panel having a plurality of said apertures, each of which is adapted for receiving a respective prong of a shelf, wherein each aperture has an associated abutment positioned on the remote side of the panel and positioned with respect to the aperture to, in use, bear a respective prong of a shelf inserted through the aperture.

Optionally, the plural apertures in the panel are arranged in groups of one or more, each group corresponding to an optional installation position for a shelf, wherein in use, the prong or prongs of a shelf are inserted through the aperture or apertures of a group corresponding to a desired installation position.

Optionally, each abutment is positioned above the lowest part of its associated aperture, and preferably above an axis through the centre of its associated aperture.

Optionally, each abutment is part of a support member attached or adjacent to the remote side of the panel to position the abutment.

Optionally, each support member is formed of sheet metal and each abutment is a substantially horizontally-extending edge of the sheet metal support member.

Optionally, the top part of each prong on the at least one shelf comprises a recess which engages with a substantially horizontally-extending edge of an abutment when bearing upwardly against an abutment.

Optionally, the recess comprises a slot that extends substantially perpendicularly to a longitudinal axis of the prong.

Optionally, the cooking grill further comprises a metal bush extending through and forming part of at least one associated aperture and preferably having a bezel surrounding each associated aperture.

Optionally, each shelf includes at least two prongs protruding therefrom and the panel has at least two apertures, each aperture for receiving a respective prong of a shelf.

Optionally, the firebox is substantially rectangular and the panel comprises at least one side panel attached to a rear panel located along a side of the firebox, and wherein the at least one side panel or rear panel lacks any shelf-supporting aperture or protrusion so that either the rear panel or one of the at least one side panels is adapted to solely support a shelf above the cooking region.

In this specification where reference has been made to patent specifications, other external documents, or other sources of information, this is generally for the purpose of providing a context for discussing the features of the disclosure. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of".

When interpreting each statement in this specification that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWING FIGURES

FIG. 9A is a perspective view from the rear of the left support member of the rear panel of FIG. 6 in isolation.

FIG. 9B is a perspective view from rear of the left support member of FIG. 9A in situ with shelves in an installed state.

DETAILED DESCRIPTION

A general description of a cooking grill (or barbecue, or simply "grill") will now be described with reference to FIGS. 2-4.

Figure 1A:
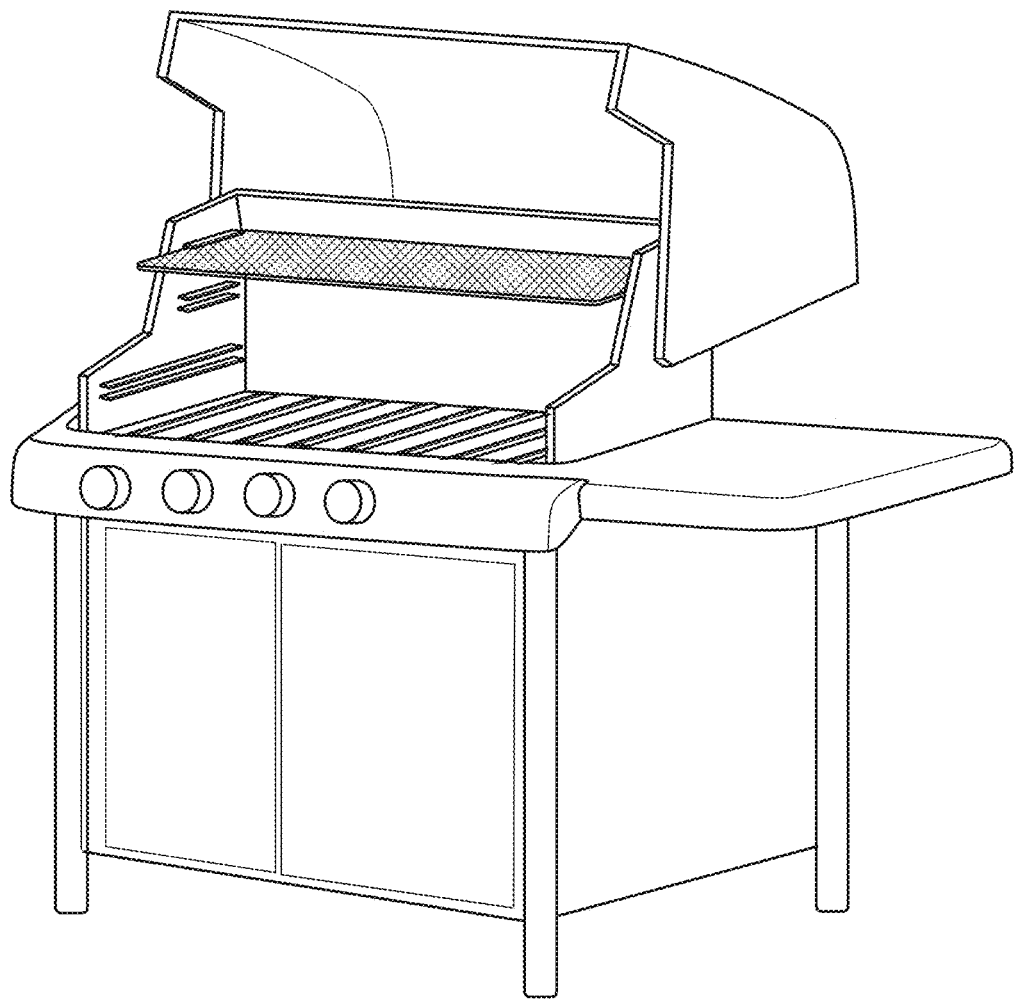
FIG. 1A is a perspective view of a prior art cooking grill set.
Figure 1B:
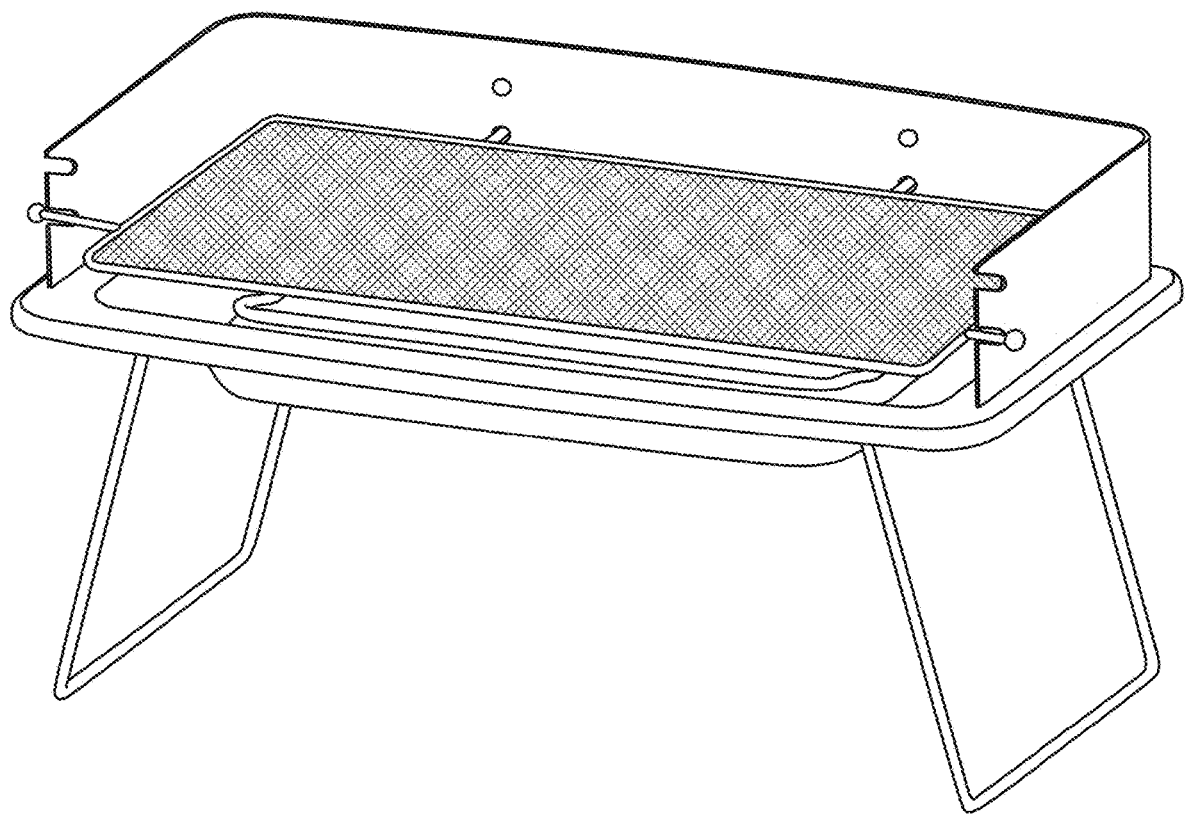
FIG. 1B is a perspective view of a prior art barbecue grill.
Figure 2:
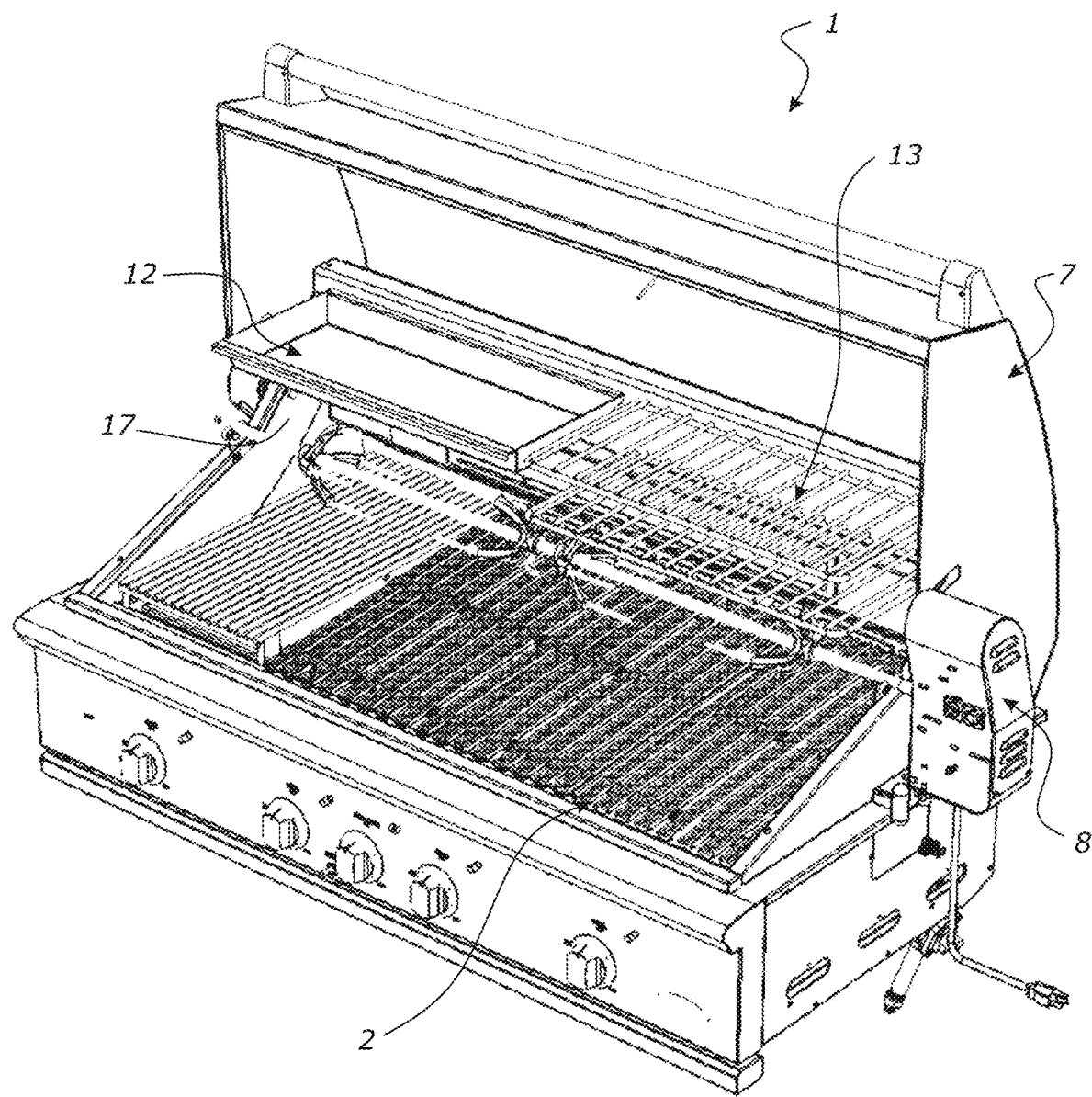
FIG. 2 is a perspective view from the front of an outdoor cooking grill set accordance to an embodiment of the present invention, incorporating a cantilevered shelf arrangement including rack and tray shelves.
Figure 3:
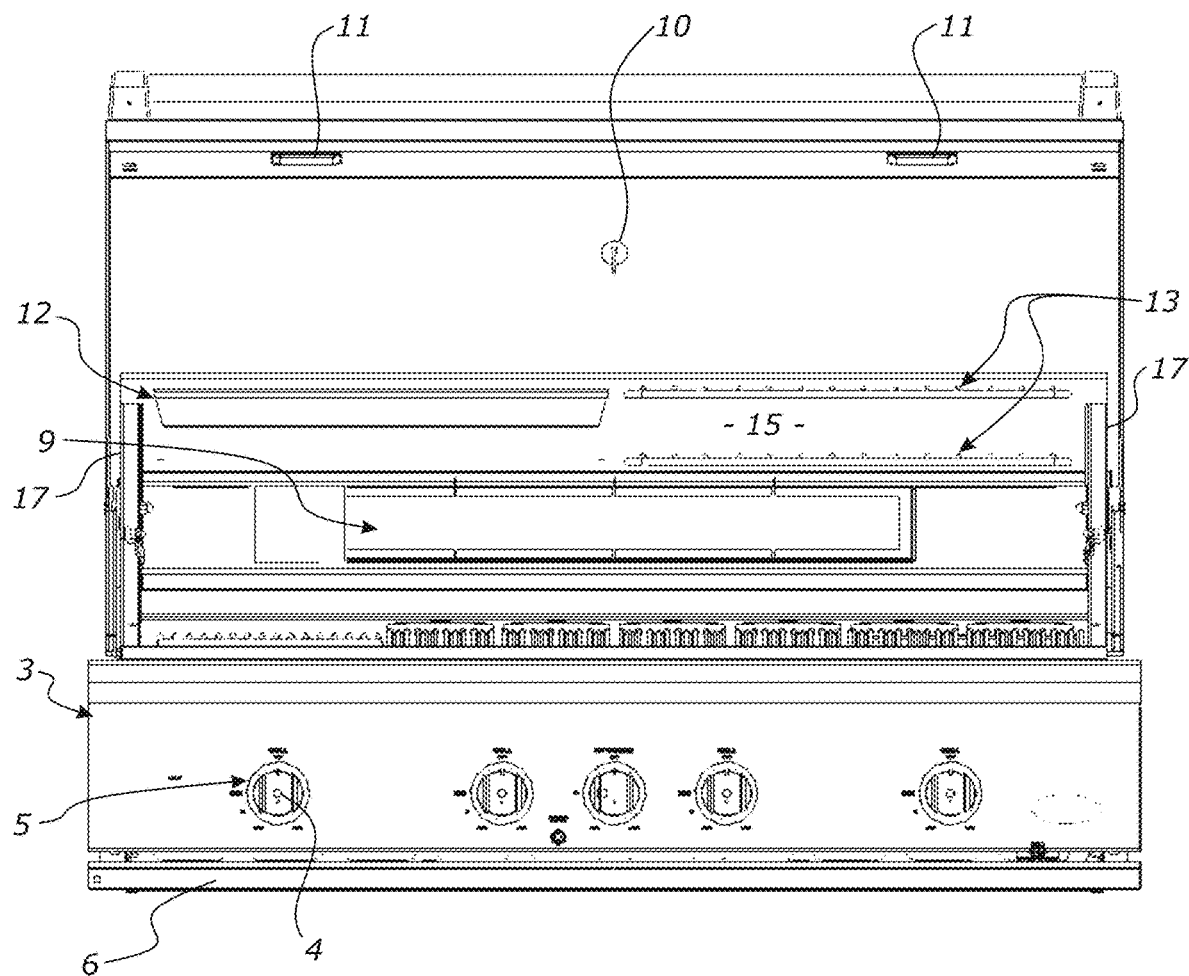
FIG. 3 is a front view of cooking grill off FIG. 2.
Figure 4:
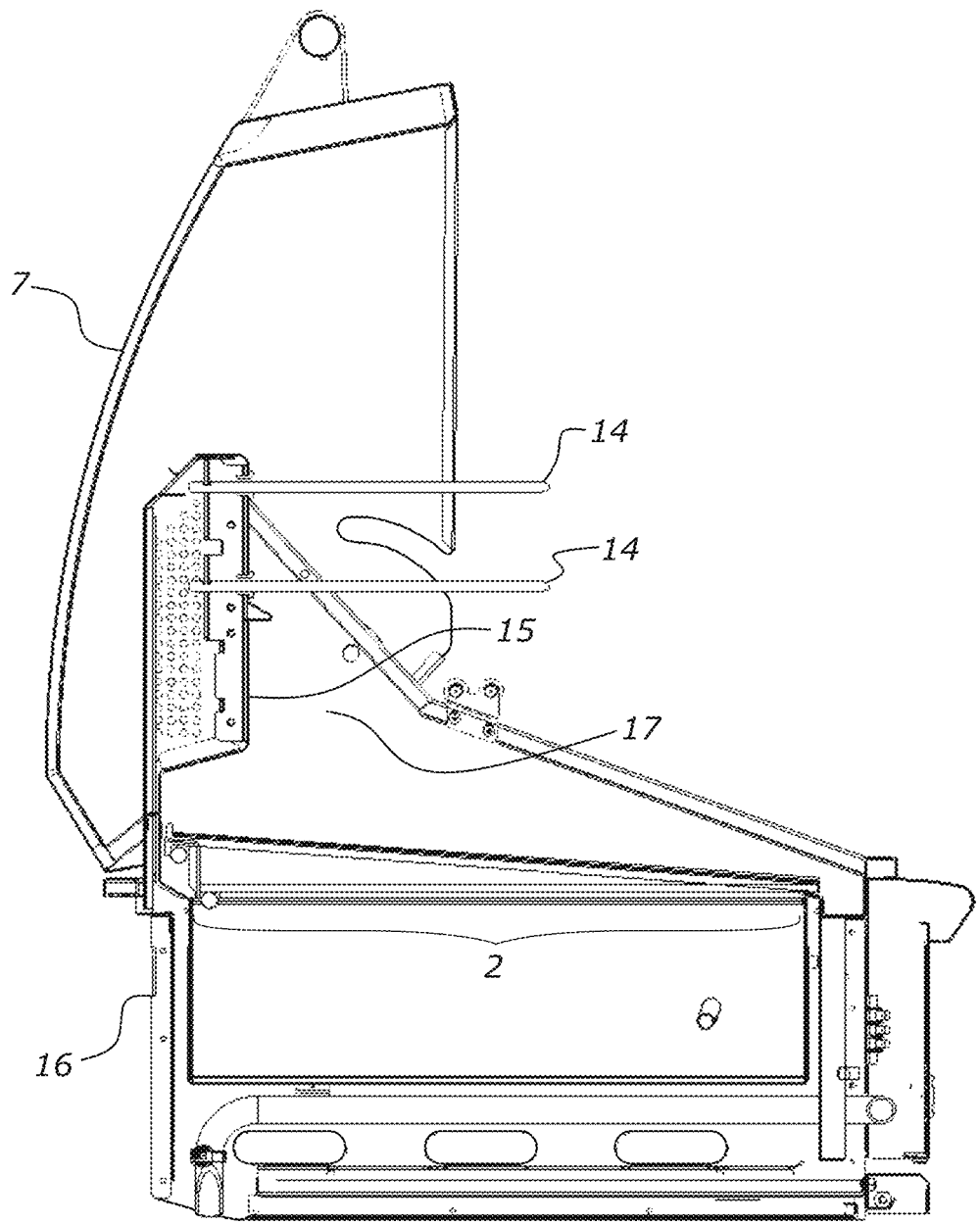
FIG. 4 is a cross-sectional side elevation view of the cooking grill of FIG. 2.

FIGS. 2 and 3 show some features of a typical cooking grill 1. This description should not be considered limiting, as cooking grills can include a wide range of add-on features. The following will therefore initially simply provide a general description of the most common features of cooking grills to provide some context to how a cooking grill 1 can be constructed to support a shelf 14 in accordance with an embodiment of the present invention.

Cooking grills 1 include a cooking region 2 for receiving food to be cooked. Heat is applied to the cooking region, at least from below, to cook the food. The cooking region 2 includes a food supporting surface(s) that may comprise cooking grates, cooking trays/plates, or the like. Cooking grill 1 includes a fire box 3 for containing heat generating elements such as gas burners for applying heat to the food placed on the food supporting surface of the cooking region. In some embodiments, the fire box 3 is a substantially rectangular box with open top and bottom surfaces, the periphery or upper edges of the box being adapted to support the food supporting surface(s) of cooking region 2. The front surface of fire box 3 conveniently provides a mounting surface for burner control dials 4 for adjusting the heat applied to the cooking region 2. The control dials 4 may optionally have illuminated bezels 5 to assist a user in low light conditions. A grease tray 6 is preferably provided beneath fire box 3 for collecting excess grease resulting from the cooking of food in cooking region 2. An overhead hood 7 is preferably provided for covering the cooking region 2 to cover the cooking food and/or to contain/direct the heat generated by the heat generating elements in firebox 3. Some cooking grills may be provided with a rotisserie unit 8 incorporating a motor for turning a rotisserie rod (not shown) mountable in supports at either lateral side of the cooking region allowing food to be spit-roasted. The food skewered by the rotisserie rod may be cooked by application of heat from an infra-red burner 9 mounted to the rear of the cooking region. Some cooking grills may have a temperature gauge probe 10 and/or lights 11 built into the hood 7 for illuminating the cooking region.

The cooking grill 1 also includes a structure at least partially surrounding the cooking region 2 for containing heat, shielding the cooking region from air currents and to provide mounting locations for hood 7. The partial surround preferably includes a substantially vertically arranged rear panel 15 placed at the rear of the cooking region as well as left and right side panels 17, as best shown, for example, in FIGS. 3 and 4. Rear panel 15 can be configured to support one or more shelves 14 for suspending food above but proximate to the cooking region 2. Each shelf 14 can be used for warming or for secondary cooking of food. A shelf 14 can comprise, for example, a solid tray 12 or wire rack 13, and depending on the cooking grill 1 configuration, the elevation and lateral position of the shelf 14 can be adjusted, as shown by the tray 12 and rack 13 depicted in FIG. 6. As will be explained in further detail, the cooking grill 1 is adapted to support one or more shelf 14 in a cantilevered fashion. FIG. 4 shows an exemplary configuration, where the shelf 14 can be solely supported at the rear panel 15 to the cooking region 2. Although the following description and drawings relate to embodiments where the shelf or shelves are solely supported by the rear panel, they could alternatively be solely supported by either one of the side panels 17.

An exemplary embodiment of the present invention will now be described in greater detail.

Figure 5:
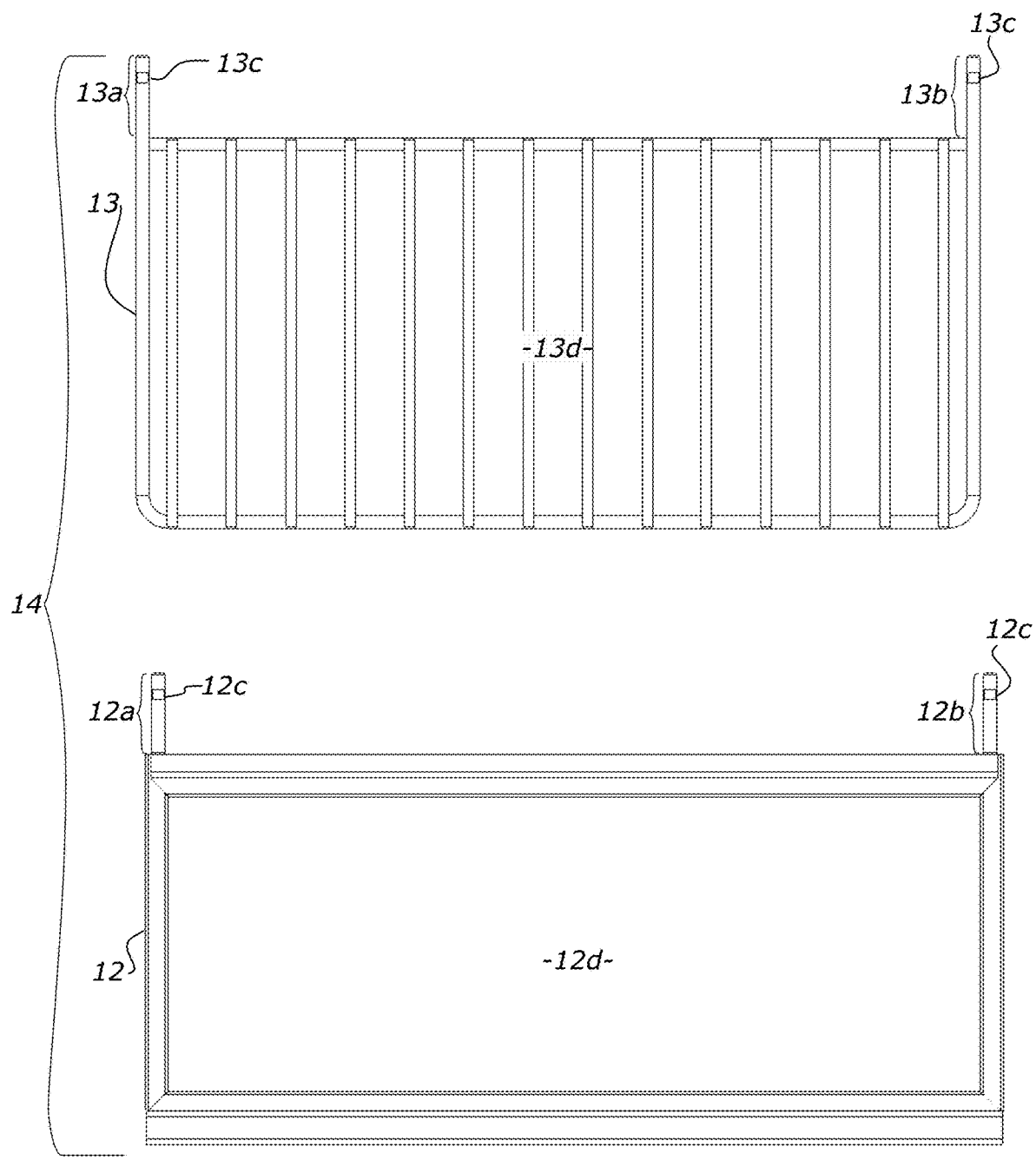
FIG. 5 is a plan view of the rack and tray shelves shown in FIG. 2.

FIG. 5 shows two examples of a shelf 14: a tray 12 and a rack 13, each comprising a food region 12d, 13d and at least one prong (or leg, or pin) for use in attaching the shelf to the cooking grill 1. The tray 12 has two legs 12a, 12b protruding from a solid, preferably dished, food region. Preferably legs 12a, 12b are pins having a diameter of around 7.9 mm that can be received by the rear panel 15 to facilitate attachment of the tray 12 to the rear panel 15. The rack 13 has two legs 13a, 13b protruding from a substantially planar, slotted food region 13d. Preferably legs 13a, 13b are pins, and more preferably have a diameter of around 7.9 mm that can received by the rear panel 15 to facilitate attachment of the rack 13 to the rear panel 15. Preferably the tray 12 has a frame (including legs 12a, 12b) made of 304 grade stainless steel wire, with 304 grade stainless steel panels TIG welded and electro-cleaned. Preferably the rack 13, including legs 13a, 13b, is made of 304 grade stainless steel wire which is bent and spot welded.

A skilled person will recognise that the dimensions of tray 12 and rack 13 can be customised to suit any particular size of the rear panel 15. For example, the cooking region 2 may be rectangular, and span much of the, for example, 36 or 48 inch width from one lateral side of the fire box to the other although a person skilled in the art will recognise that other sizes and/or width dimensions could be catered for. The rear panel 15, tray 12 and rack 13 may then be suitably dimensioned based on the dimensions of the cooking region 2. Although the drawing figures show two shelves side by side spanning the width of the cooking region, a single shelf could be provided spanning the entire cooking region or only a portion thereof. Similarly, more than two shelves could be spaced across the width of the cooking region.

Figure 6:
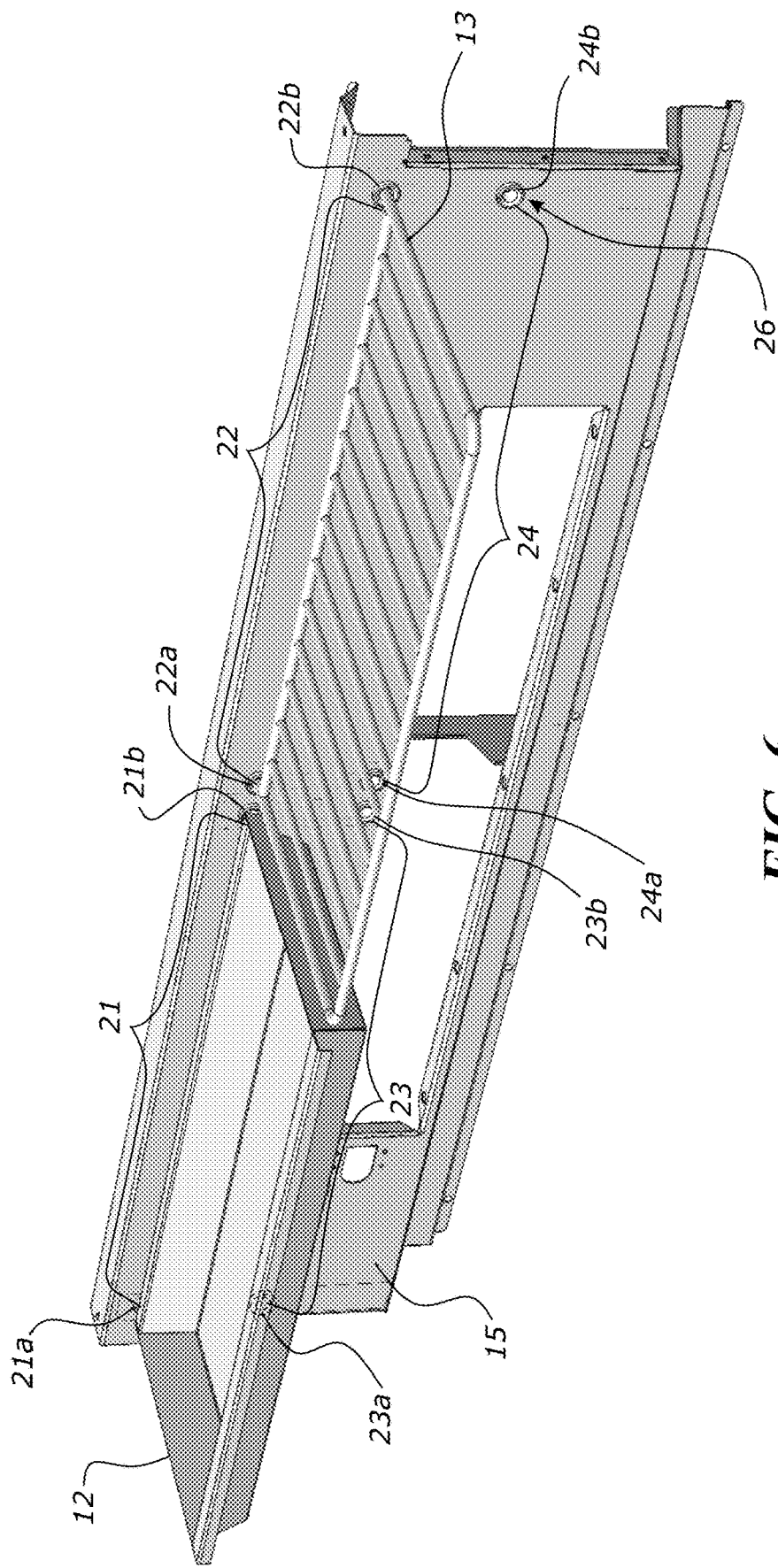
FIG. 6 is a perspective view from the front of the rear panel of the cooking region surround structure shown in FIG. 2 including the rack and tray shelves.
Figure 7:
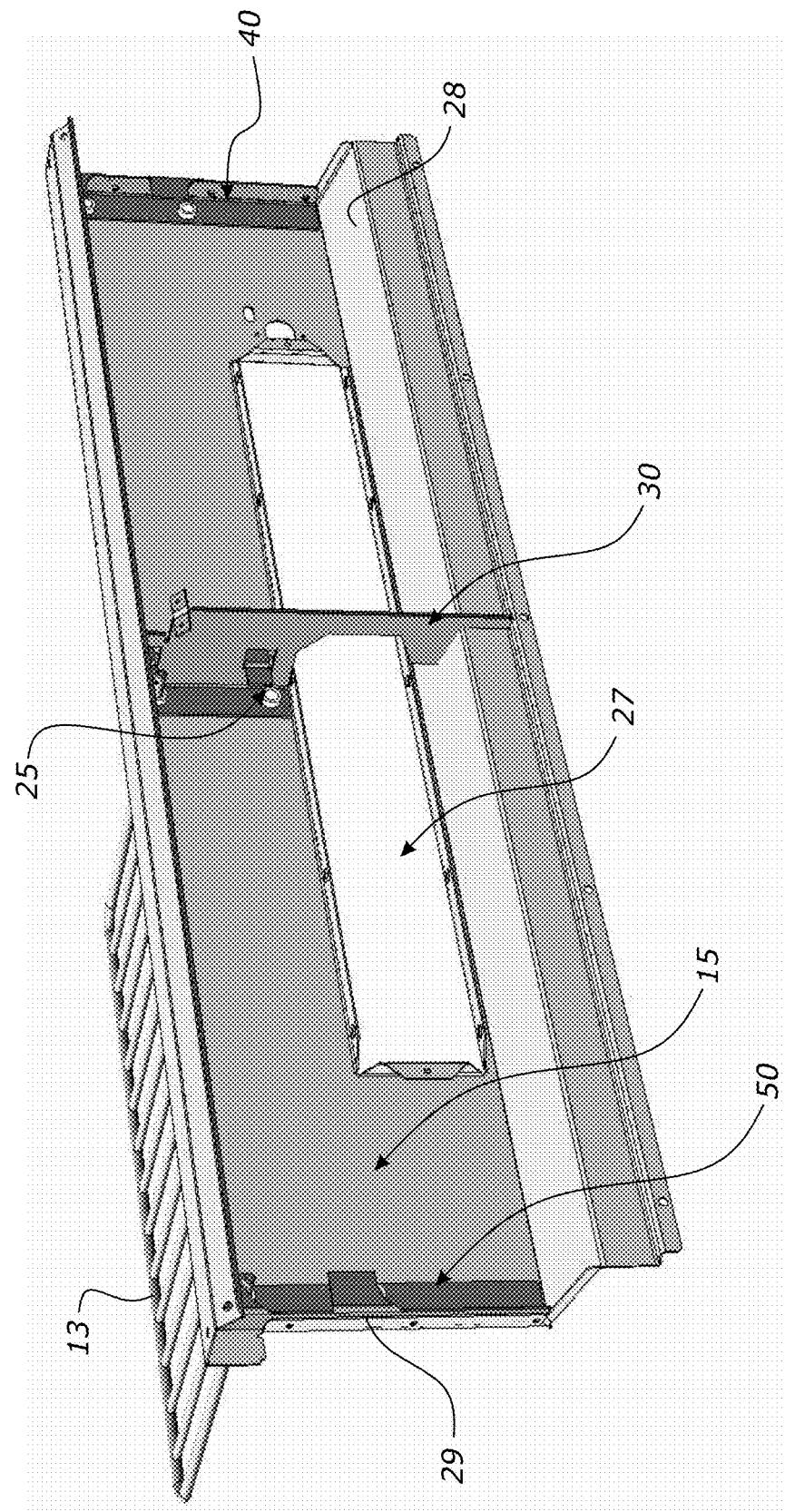
FIG. 7 is a perspective view from the rear of the rear panel of FIG. 6 with the tray shelf removed.

FIGS. 6 and 7 show perspective views from the front and rear, respectively, of a shelf (tray 12 and/or rack 13) mounted to the rear panel 15 of the at least partial cooking region surround structure. The rear panel 15 preferably has a single-assembly support wall positioned at the rear of the cooking region 2, as a component of the partial surround to the cooking region 2. The rear panel 15 can include an infra-red burner opening 27, which allows the infra-red burner 9 to be mounted to the rear panel and to radiate heat toward and/or above the cooking region 2 and onto the rotisserie spit when installed (the rear panel 15 may be seen as an infra-red burner assembly in this case). A base member 28 may be attached to or extend integrally from the rear panel 15 to provide a lower attachment flange for connection to the upper rear edge of the fire box. Bent tabs 29 (optionally hand bent) may be placed at opposite lateral ends of the rear panel 15, and used to attach the rear panel to further panels of the partial surround structure, such as left and right side panels. All components of the rear panel 15 can be made from 304 grade stainless steel.

In the embodiment illustrated in the drawings, the rear panel 15 has eight apertures that provide four different potential shelf installation positions, 21-24. Panel apertures 21a and 21b form a first aperture group providing a first shelf position occupied in FIG. 6 by tray 12. Panel apertures 22a and 22b form a second aperture group providing a second shelf position occupied in FIG. 6 by rack 13. Panel apertures 23a and 23b form a third aperture group providing a third shelf position below tray 12 in FIG. 6. Panel aperture 24a and 24b form a fourth aperture group providing a fourth shelf position below rack 13 in FIG. 6. The four shelf positions allow the user to either mount four shelves on the rear wall or, if fewer than four shelves are provided/required, then the user may adjust the elevation and or lateral location of at least one of the shelves by moving it/them to an alternative shelf installation position.

The rear panel 15 also has three support members 30, 40 and 50 on the rear side of the rear panel 15, furthest from the cooking region. The three support members include a central support member 30, a left side support member 40 and a right side support member 50. The support members 30, 40, 50 are preferably placed forward of a back panel 16 of the fire box 3 (see FIG. 4). The support members 30, 40, 50 are used to support the tray 12 or rack 13 to the rear panel 15. The support members 30, 40, 50 are attached to the rear panel 15 to thereby form a rear panel assembly. Preferably the support members are formed as sheet support components, and more preferably, sheet metal support components formed, for example, from sheet steel. The central support member 30 may be referred to as a central support structure. The left support member 40 and right support member 50 may be collectively referred to as lateral support members, or each referred to as a side support structure.

Figure 8:
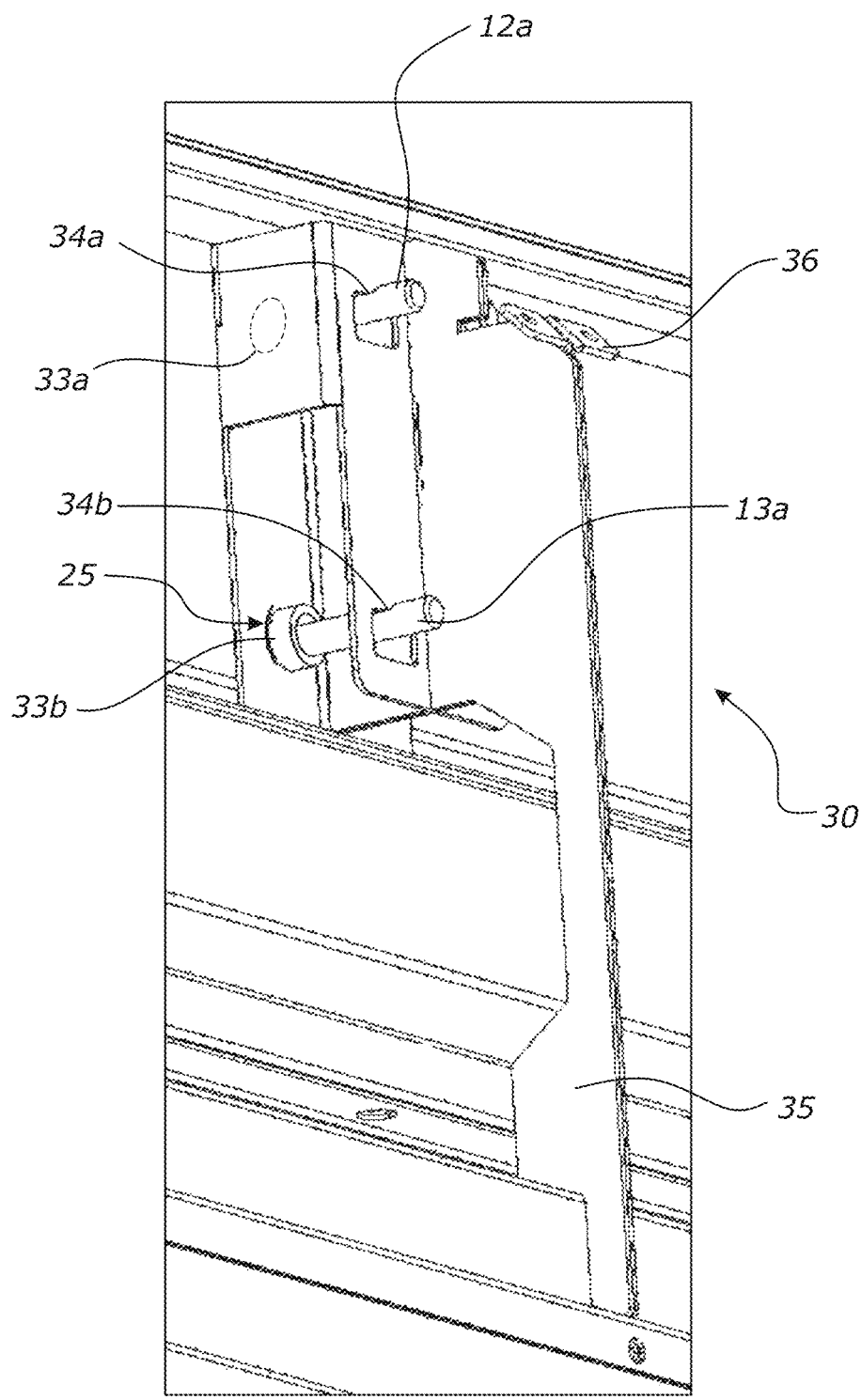
FIG. 8 is a perspective view from the rear and below of the central support member of the rear panel of FIG. 6 showing the shelves in an installed state.
Figure 10:
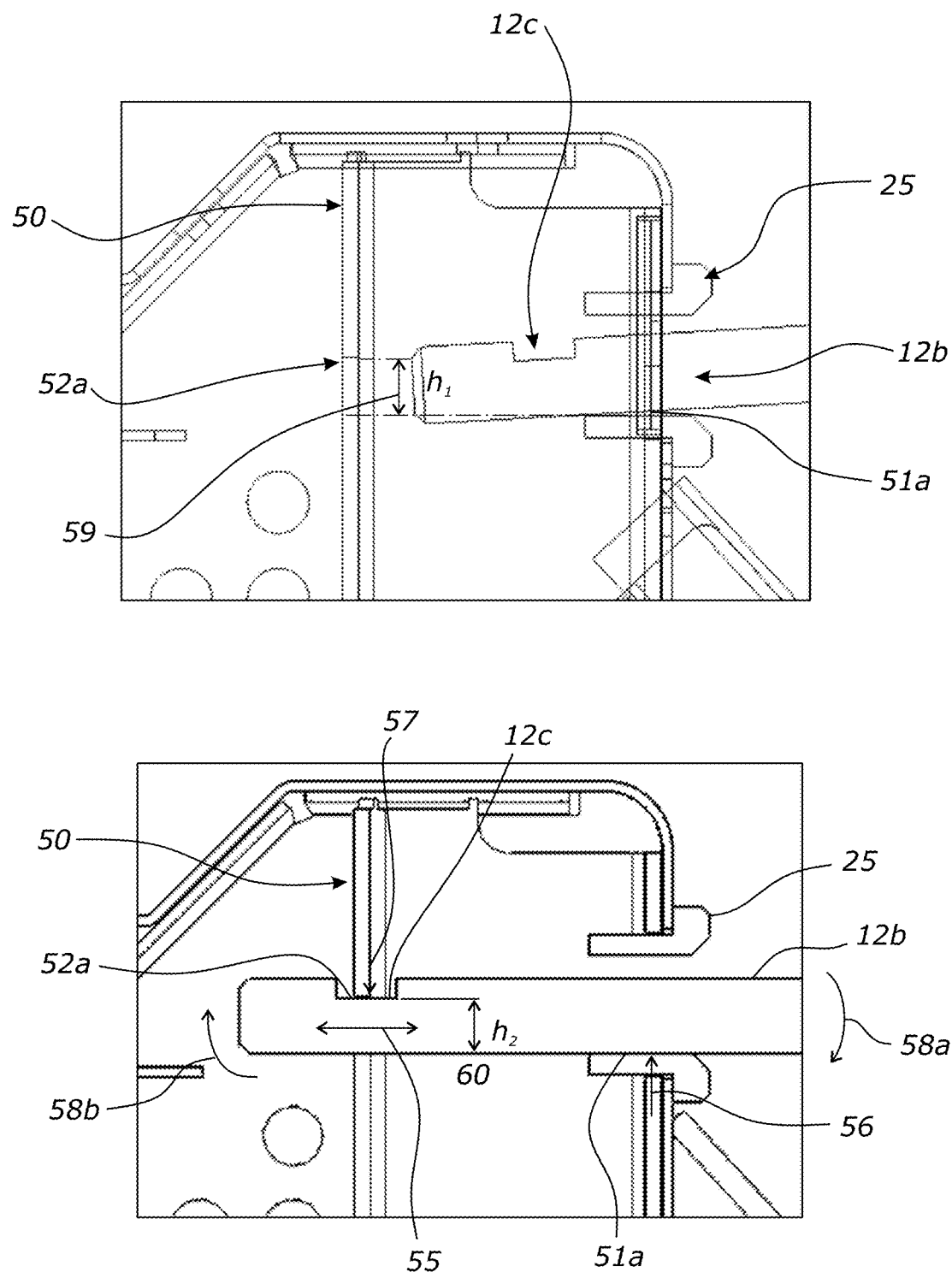
FIG. 10 is a pair of side elevational cross-sectional detail views showing a shelf leg/prong being inserted into and supported solely by the rear panel and its support members.

FIGS. 8 to 10 illustrate how support members 30, 40 and 50 can interact with a shelf 14 so that the shelf is secured to and supported by the rear panel assembly. In particular, support members 30, 40 and 50 have abutments each located rearward of a respective prong pivot point at/around the rear panel, the abutments configured to apply a generally downwardly directed reaction force at or near the distal ends of the prongs of a shelf 14 to counteract the upwardly directed force from the prong ends due to the weight of the shelf and any food placed in the food region 12d, 13d acting about the pivot.

FIG. 8 is a perspective view from the rear of the central support member 30 assisting the supporting of an upper tray 12 and a lower rack 13. The central support member 30 has support member apertures 33a and 33b for receiving legs 12a and 13a, respectively. Central support member 30 incorporates two pairs of vertically spaced apertures and so, although not visible in FIG. 8, two further apertures are provided spaced laterally to apertures 33a and 33b, for receiving legs/prongs from one end of shelves located on the left-hand-side (when viewed from the front) of the cooking region. Each of the apertures in central support member 30 is aligned with one of the apertures 21a, 21b, 22a, 22b, 23a, 23b, 24a or 24b in rear panel 15. Preferably, as shown most clearly in FIG. 10, each of the apertures in rear panel 15 has inserted therein a cylindrical bush 25 having a flange on its front/forward end adjacent the rear panel to provide a bezel 26 around each aperture to assist in locating the shelf prongs and protecting the openings from deformation in use. Each bush also passes through the aligned support member aperture. The central support member 30 also has abutments 34a, 34b which are used to engage with legs 12a, 13a in order to support and secure shelves 14 to the cooking grill 1. Similar abutments (not shown) are used to engage with legs/prongs of shelves inserted through the laterally spaced but hidden apertures in central support member 30 as shown in FIG. 8.

Preferably, the abutments comprise a downwardly directed face or edge surface, and more preferably each abutment is positioned vertically above the axis of a corresponding wall aperture 21b, 23b, 22a, 24a, respectively. Preferably, the abutments are edges that form at least a part of the central support member 30, and more preferably the abutments are substantially horizontally extending edges. Preferably, the central support member is made of three folded parts that are welded (such as TIG welded) together for maximum strength and rigidity. Preferably, the central support member 30 has a screw tab 35 at its base that can be fitted into a hole in the base member 28 of the rear panel 15. This provides stiffness to the rear panel 15. Preferably, the central support member 30 has screw tabs 36 at the top which can be fastened to back panel 16 in order to add further stability to the rear panel 15.

FIG. 9A is a perspective view from the rear of the left support member 50 while FIG. 9B is a view from the rear of the rear panel 15 showing left support member 40 as part of the rear panel assembly. Again, these drawings illustrate the case where an upper tray 12 and a lower rack 13 are mounted to the rear panel. The left support member 50 has support member apertures 51a, 51b for receiving legs/prongs 12b and 13b, respectively. As previously explained, apertures 51a and 51b are aligned with rear panel apertures 22b and 24b, respectively, and a bush 25 is inserted through each pair of aligned apertures. The left support member 50 also includes abutments 52a, 52b which are used to engage with legs 12b, 13b in order to support and secure shelves 14 to the cooking grill rear panel as previously described. Right support member 50 is a mirror image of left support member 40 and includes apertures corresponding in position to apertures 21a and 23a.

FIG. 10 is a pair of cross-sectional side elevational views of the upper portion of right support member 50, showing a tray leg/prong 12b inserted therein. Tray 12 has two legs 12a, 12b, with each leg having an upper contact surface 12c and the previously mentioned prong pivot point at/around the rear panel where the lower surface of the prong contacts the rear panel aperture or bush 25. Similarly, rack 13 has two legs 13a, 13b, with each leg having a contact surface 13c (see FIG. 5). The contact surfaces 12c, 13c are configured to provide weight bearing surfaces for the legs against the abutments formed in the left, right and central support members, such as abutments 34a, 34b, 52a and 52b. Preferably, the upper contact surfaces 12c, 13c are located near the distal end of legs 12a, 12b, 13a, 13b. The contact surfaces 12c, 13c are at least partially upwardly facing. Preferably, the contact surfaces 12c, 13c are recesses in the form of machined slots or grooves, or channels or notches, and more preferably, the slots extend in a plane that is substantially perpendicular to the axis of the leg in which they are formed. As can be seen in FIG. 10, the slots providing contact surfaces 12c, 13c extend a radial distance into the prong that is less than half of the prong's nominal diameter, preferably less than one third of the prong's nominal diameter. The slots have an axial slot width that is at least slightly larger than the thickness of the material forming the abutment that will abut the contact surface of the prong. Once the shelf is installed correctly, the slots retain the leg in place and prevent forward/backward movement as shown by arrow 55 because the abutment limits axial movement of the prong.

As shown in FIG. 10 by way of example, the tray is supported by the rear panel and its support members in a cantilever fashion. When the leg 12b is secured, the lower inner surface of aperture 51a (or the lower inner surface of bush 25, if installed) applies an upwardly directed force 56 at the aforementioned pivot point against a portion of the bottom surface of leg 12b so that the shelf 14 rests in position. At the same time, abutment 52a applies a downwardly directed force 57 that provides an opposing force against that produced by the clockwise moment 58a, 58b due to the weight of the tray and any food placed in the food region 12d. A similar principle preferably applies to all other apertures and their respective abutments described hereinbefore.

As shown in FIG. 10 by way of example, it is preferable that the height difference $h_1$ (59) between the bottom surface of the abutment 52a and the inner bottom surface of the aperture 51a (or bush 25, if installed) is substantially the same as the reduced radial thickness $h_2$ (60) of the prong 12b at the contact surface 12c. Ensuring that distances $h_1$ (59) and $h_2$ (60) are substantially the same means that shelf 14 is substantially horizontal when locked in place. A similar principle preferably applies to all other apertures and their respective abutments described hereinbefore. It will be appreciated that making $h_1$ slightly smaller than $h_2$ will result in the shelf's food region being slightly downwardly sloped towards the rear panel and this is preferred to the alternative situation where items of food could tend to fall from the shelf onto the grilling surface.

A shelf leg may be inserted and secured into the central support member 30 and the left support member 40 in a similar manner to the above-described process for the right support member 50 with respect to FIG. 10.

In summary, the prong of shelf 14 is inserted through the aligned rear panel and support member apertures such that a bottom/lower part/surface of the prong rests on the apertures/bush and a top part of the prong bears upwardly against an abutment of a support member to support the shelf in a cantilevered fashion such that the food region 12d, 13d extends towards and is supported above the cooking region 2, solely supported by the rear panel assembly.

Preferably, the bushes 25 are metallic, such as grade 304 stainless steel. Preferably, the bushes are TIG welded into the single rear wall assembly. Preferably, bushes 25 have an internal diameter of about 10.5 mm and the axial distance from the front of a bezel 26 to the back of the corresponding abutment surface is about 37.95 mm. It is envisioned that circlips could be provided to fix the bushes to the rear panel assembly as an alternative to welding so that the bushes could be removable. When inserted into openings in the rear/side panel, bushes 25 becomes part of the panel so that the leg-receiving apertures in the panels correspond to the central openings in the bushes. Or in other words, each bush forms part of an aperture.

Securement of the shelf 14 to the cooking grill 1 will now be described in greater detail.

The rear panel 15 allows the tray 12 to be secured in four different shelf positions 21-24 on the rear panel 15.

A tray 12 can be secured in the first shelf position 21 by slotting leg 12a and leg 12b into the bezels 26 of bushes through wall aperture 21a and wall aperture 21b respectively. The front of tray 12 is elevated slightly while the legs 12a, 12b are inserted through the bezels 26. The left support member 40 and central support member 30 are positioned rearward of the rear panel 15, away from the cooking region 2. Leg 12a is slotted into wall aperture 21a (and the aligned aperture in left support member 40) while leg 12b is slotted into wall aperture 21b (and the aligned aperture in central support member 30). To lock the tray 12 in the first shelf position 21, an abutment of the left support member 40 engages with the contact surface 12c on leg 12a, and an abutment of the central support member 30 engages with the contact surface 12c on leg 12b. The rear panel 15 can be said to secure the tray 12 into the first shelf position 21 when legs 12a, 12b load their respective bezels 26 downwardly and load their respective abutments upwardly. Alternatively, tray 12 can be secured in the second shelf position 22, third shelf position 23, or the fourth shelf position 24 in a similar fashion. Also, rear panel 15 allows a rack 13 to be secured in one of the four different shelf positions 21-24.

It is envisioned that shelves 12, 13 could alternatively be secured to the rear panel 15 using only a single aperture in the rear panel and aligned support member aperture, with a single support member abutment for supporting and locking the shelf 12, 13 in position. It will be appreciated that the apertures in the support members need only be provided when a face of the support member would otherwise occlude the corresponding rear panel aperture. The support member could alternatively be configured so that the face contacting the back of the rear panel has a break or an edge cut-out that aligns with the aperture in the rear panel.

Accordingly, the cooking grill 1 as described herein supports shelves 12, 13 using only a single rear panel 15 (or a single side panel 17) by way of a cantilever mechanism. The cantilever mechanism allows the shelves 12, 13 to be supported by only a single wall of the cooking region surround structure, and thereby enables the shelves 12, 13 to be simply and aesthetically pleasing attached to the cooking grill 1. The shelves 12, 13 do not need to be supported at their lateral sides by adjacent panels/walls of the partial surround of the cooking region. This avoids unnecessary visible supporting features that add complexity to the appearance of the cooking grill 1 thereby providing a visually appealing, less cluttered appearance to the cooking grill 1. The removal of such unnecessary supporting features also reduces the surface area that would otherwise require regular cleaning as a result of the accumulation of cooking residues.

Furthermore, the cooking grill 1 can be configured to support the shelves 14 in a manner that allows the shelves 14 to carry a large weight of food. For example, a large brisket of meat weighs around 8 lbs (3.6 kg). It is desirable that the cooking grill 1 is configured to provide solid and/or sturdy support to the shelves 14 so that each shelf 14 can safely support a load of around 3.6 kg and more preferably, a weight of up to around 5 kg, and even more desirably each shelf 14 can be overloaded to support a weight of around 9 kg without failure. In addition, it is desirable that the shelves 14 may be quickly and easily removed and repositioned (or adjusted in height) on the rear panel 15 but that when installed, they will not accidentally become detached from the rear wall.

While each shelf has been described as having two prongs (in the form of legs or pins), this is not essential. More than two prongs could be provided, or even a single prong. In a single prong arrangement, preferably the prong would have a greater width and may even be flat (rather than round) in cross-section and the rear panel aperture could be similarly shaped and dimensioned to prevent lateral rotation of the prong and shelf when installed.

Preferred embodiments of the invention have been described by way of example only and modifications may be made thereto without departing from the spirit and scope of the invention.

The invention claimed is:

1. A cooking grill, comprising:
    a fire box with a cooking region; and
    a panel at the rear or side of the cooking region of the firebox, the panel adapted to support a shelf above the cooking region, the shelf having at least one prong extending therefrom, the panel comprising:
        at least one aperture, each aperture for receiving a respective prong of a shelf, and
        an abutment, for each aperture, positioned on the side of the panel remote from the cooking region and positioned with respect to its aperture to bear a respective prong of a shelf inserted through its aperture;
    wherein in use, each prong of a shelf is inserted through an aperture such that a bottom part of each prong is supported by the periphery of an aperture and a top part of each prong bears upwardly against an abutment to support the shelf in a cantilevered fashion above the cooking region.

2. The cooking grill according to claim 1, further comprising at least one shelf above the cooking region, wherein the at least one shelf has a plurality of prongs and the panel has a plurality of said apertures, each of which is adapted for receiving a respective prong of a shelf, wherein each aperture has an associated abutment positioned on the remote side of the panel and positioned with respect to the aperture to, in use, bear a respective prong of a shelf inserted through the aperture.

3. The cooking grill according to claim 2, wherein the plural apertures in the panel are arranged in groups of one or more, each group corresponding to an optional installation position for a shelf, wherein in use, the prong or prongs of a shelf are inserted through the aperture or apertures of a group corresponding to a desired installation position.

4. The cooking grill according to claim 1, wherein each abutment is positioned above the lowest part of its associated aperture.

5. The cooking grill according to claim 4, wherein each abutment is positioned above an axis through the centre of its associated aperture.

6. The cooking grill according to claim 1, wherein each abutment is part of a support member attached or adjacent to the remote side of the panel to position the abutment.

7. The cooking grill according to claim 6, wherein each support member is formed of sheet metal and each abutment is a substantially horizontally-extending edge of the sheet metal support member.

8. The cooking grill according to claim 2, wherein the top part of each prong on the at least one shelf comprises a recess which engages with a substantially horizontally-extending edge of an abutment when bearing upwardly against an abutment.

9. The cooking grill according to claim 8, wherein the recess comprises a slot that extends substantially perpendicularly to a longitudinal axis of the prong.

10. The cooking grill according to claim 1, further comprising a metal bush extending through and forming part of at least one associated aperture.

11. The cooking grill according to claim 10, wherein the or each metal bush has a bezel surrounding its associated aperture.

12. The cooking grill according to claim 1, wherein each shelf includes at least two prongs protruding therefrom and the panel has at least two apertures, each aperture for receiving a respective prong of a shelf.

13. The cooking grill according to claim 1, wherein the firebox is substantially rectangular and the panel comprises at least one side panel attached to a rear panel located along a side of the firebox, and wherein the at least one side panel or the rear panel lacks any shelf-supporting aperture or protrusion so that either the rear panel or one of the at least one side panels is adapted to solely support a shelf above the cooking region.

14. The cooking grill according to claim 1, wherein the at least one prong extends rearwardly from the shelf.

15. A cooking grill, comprising:
    a fire box with a cooking region;
    at least one shelf above the cooking region; and
    a panel at the rear or side of the cooking region of the firebox, the panel adapted to support the at least one shelf above the cooking region, the at least one shelf having a plurality of prongs extending therefrom, the panel comprising:
        a plurality of apertures, each aperture for receiving a respective prong of the at least one shelf, and an abutment, for each aperture, positioned on the side of the panel remote from the cooking region and positioned with respect to its aperture to, in use, bear a respective prong of the at least one shelf inserted through its aperture;

wherein in use, each prong of the at least one shelf is inserted through an aperture such that a bottom part of each prong is supported by the periphery of an aperture and a top part of each prong bears upwardly against an abutment to support the at least one shelf in a cantilevered fashion above the cooking region.

\* \* \* \* \*